July 7, 1925.

O. BEZANSON ET AL 1,544,798

ALL CERAMIC FURNACE

Filed Jan. 2, 1923

Inventors:
Osborne Bezanson,
Myles S. Maxim,
By Byrne, Townsend & Brickenstein,
Attorneys.

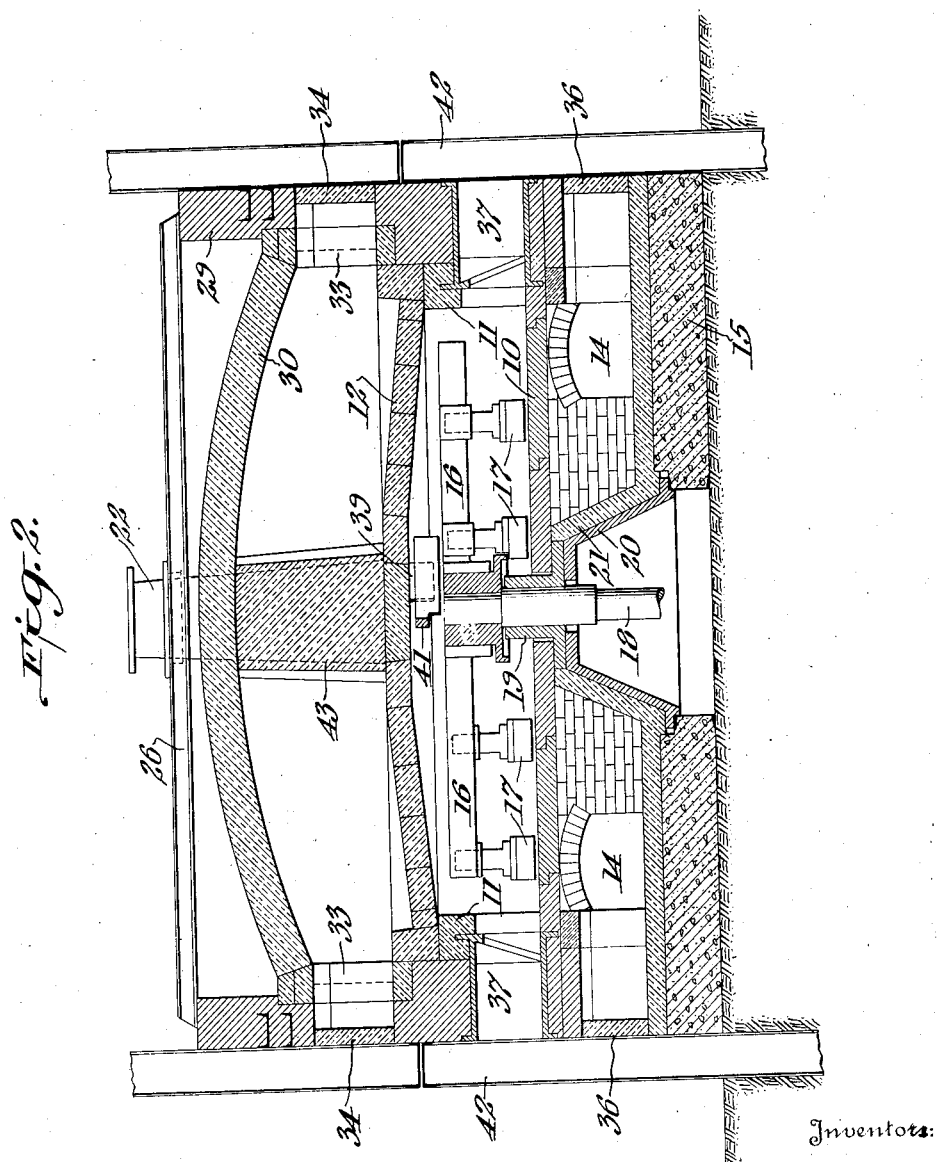

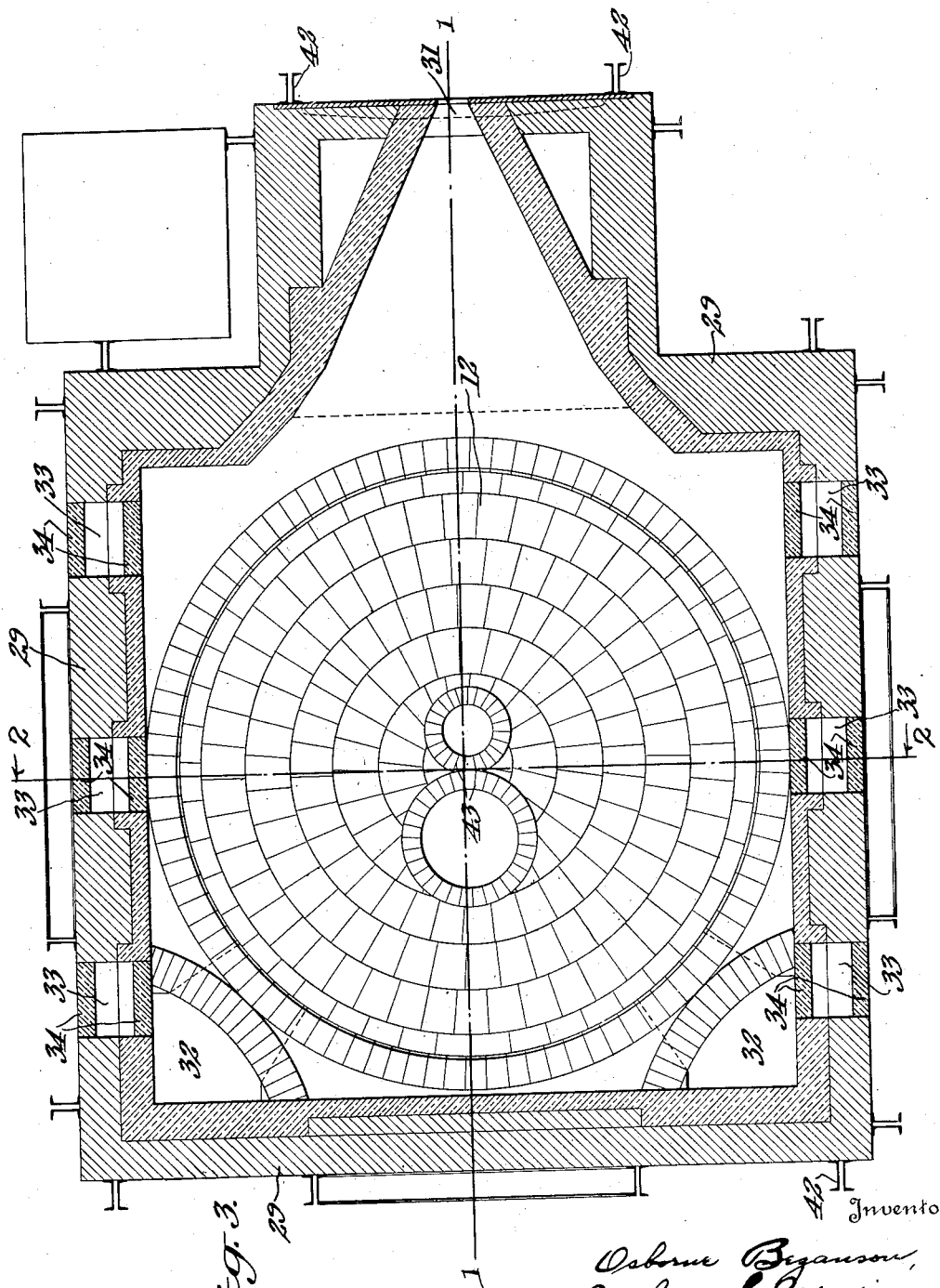

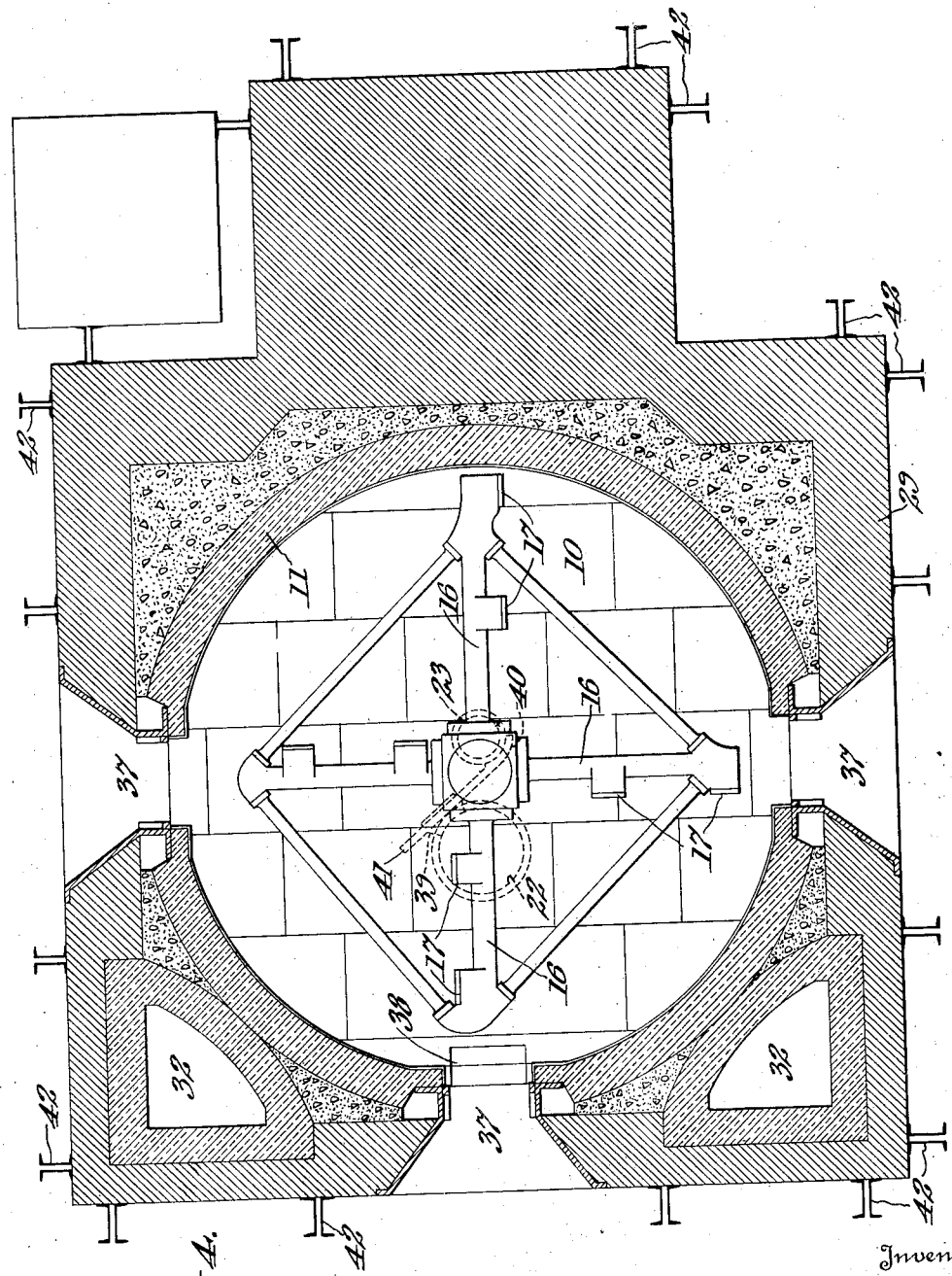

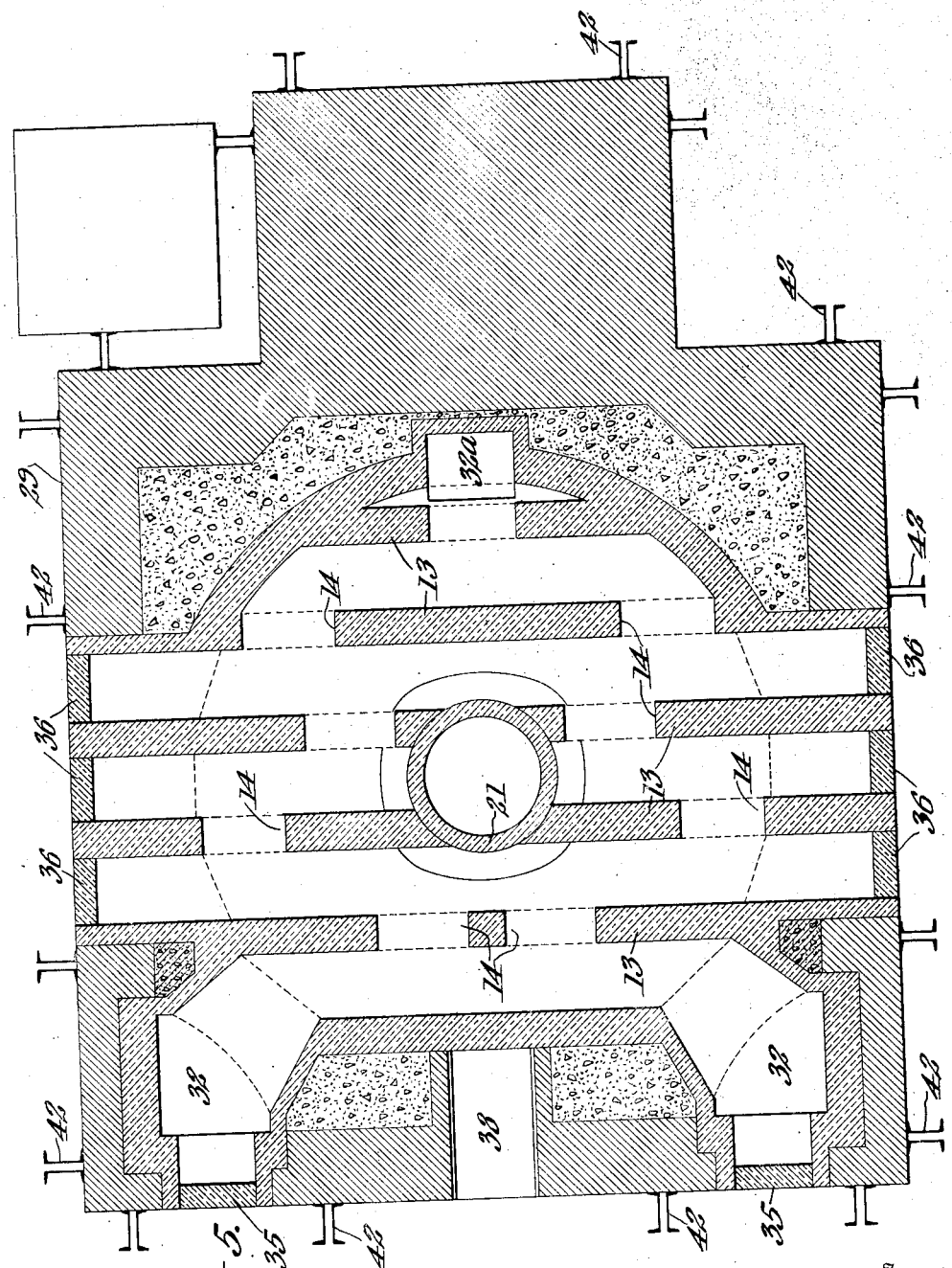

Patented July 7, 1925.

1,544,798

UNITED STATES PATENT OFFICE.

OSBORNE BEZANSON, OF WOBURN, AND MYLES S. MAXIM, OF SOMERVILLE, MASSACHUSETTS, ASSIGNORS TO MERRIMAC CHEMICAL COMPANY, OF WOBURN, MASSACHUSETTS, A CORPORATION OF MASSACHUSETTS.

ALL-CERAMIC FURNACE.

Application filed January 2, 1923. Serial No. 610,270.

*To all whom it may concern:*

Be it known that we, (1) OSBORNE BEZANSON, and (2) MYLES S. MAXIM, citizens of the United States, residing at (1) Woburn, (2) Somerville, in the county of Middlesex and State of Massachusetts, have invented certain new and useful Improvements in All-Ceramic Furnaces, of which the following is a specification.

This invention relates to furnaces of the type used for the manufacture of hydrochloric acid by the reaction between sodium chlorid and sulfuric acid.

It is the object of the invention to provide a furnace of the type referred to which can be built at a lower first cost, has a longer life and involves lower repair charges than constructions heretofore used and which is economical in operation.

For a full understanding of the invention and the characteristic features thereof, reference is made to the accompanying drawings in which, Fig. 1 is a vertical section through a furnace on the line 1—1 of Fig. 3.

Fig. 2 is a vertical section on the line 2—2 of Fig. 3.

Fig. 3 is a horizontal section on the line 3—3 of Fig. 1.

Fig. 4 is a horizontal section on the line 4—4 of Fig. 1; and

Fig. 5 is a horizontal section on the line 5—5 of Fig. 1.

Figure 1:
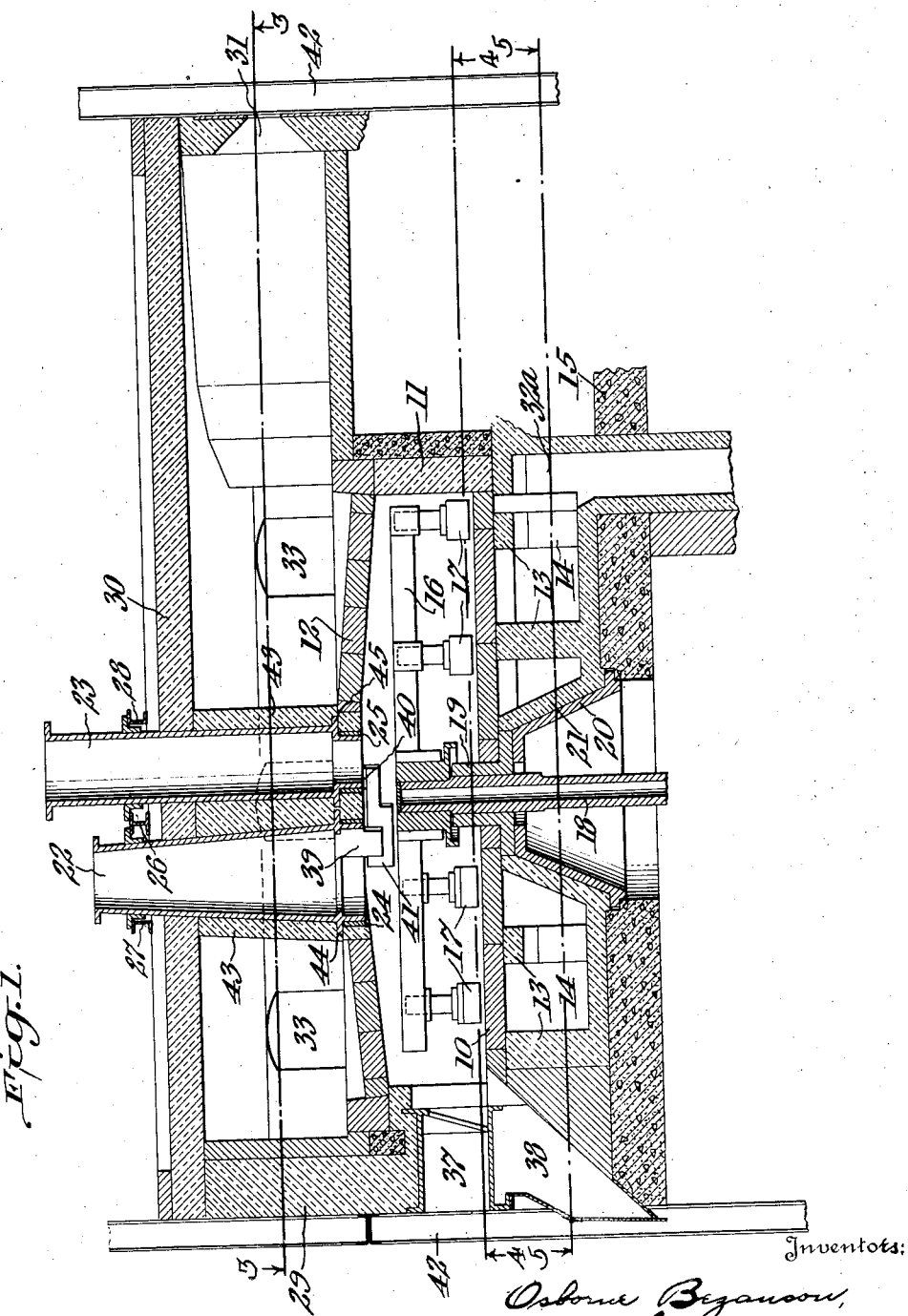

The construction constitutes what may be called an all-ceramic furnace. All parts exposed to the reaction material are composed of ceramic material, except the stirrer construction.

The reaction chamber comprises a bottom 10 of matched tile, side walls 11 of fire brick and an arch 12 of special tile. The support for the reaction chamber comprises a plurality of transverse, preferably parallel brick walls 13 provided with openings 14 disposed in staggered relation. As indicated the structure as a whole is built on a concrete foundation 15.

The frame 16 carrying the stirrers 17 is mounted upon a vertical shaft 18 which is guided in a cast iron flanged hub 19. The latter is bolted to the base casting 20 and protected by a brick or tile ring 21.

The feed pipe 22 and the gas pipe 23 are supported by cast iron bull rings 24 and 25 respectively set in the arch 12. The joint between the pipes and the bull rings is preferably formed as a rust joint. The weight of the pipes 22 and 23 is carried by a steel structure including beams 26, 27 and 28.

The furnace chamber is formed above the arch 12 by fire brick lined walls 29 extending up from the concrete foundation and terminating in an arched roof 30. The furnace chamber has at one side a substantially trumpet-shaped opening widening into the furnace. The constricted opening 31 is adapted to receive the flame projector of an oil burner. In the corners opposite the opening 31 stacks 32 lead down into the space below the bottom of the reaction chamber and form passages for the products of combustion which after sweeping over the arch 12 pass down through stacks 32 and then in zig-zag course through the openings 14 to a conduit 32ª leading to the chimney.

In the side walls of the combustion chamber are clean-out openings 33 which are normally closed by slabs 34. Similar openings 35 and 36 lead to the bottom of the stacks 32 and to the passages of the baffle construction constituted by walls 13 respectively.

The reaction chamber is accessible through a plurality of doors 37 one of which is in alignment with a discharge chute 38 through which the solid products of reaction or the sodium sulfate in particular may be removed.

From the pipes 22 and 23 depend lugs 39 and 40 respectively which support a stationary scraper 41 immediately over the stirrer frame.

The structure as a whole is braced by a frame work of angle irons 42 which also support the beams 26, 27 and 28.

The pipes 22 and 23 are protected by fire brick walls 43 between the arch 12 and the roof 30, resting on flanges 44 and 45 of the pipes.

The important structural features of the arrangement described are as follows:

The bottom, top and walls of the reaction chamber and of the combustion chamber including the heating passages are of special tile or fire brick. The resistivity against acid and heat is therefore a maximum. At the same time the special tile of which the bottom of the reaction chamber is composed offers a greater resistance to the abrasive action of the material continuously moving over it than cast iron. This arrangement is thus instrumental in not only prolonging the life of the furnace as compared with the constructions heretofore used, but above all eliminates the extensive repair work necessary with the constructions of the prior art. One of the principal difficulties encountered heretofore is the occurrence of intensive local heat reactions and the action of $SO_3$ on cast iron which very often cause cracking of the cast iron bottom. By means of the construction described the bottom of the reaction chamber is substantially immune. The furnace will of course wear out, but this wearing out process is only gradual and slow as compared with prior constructions.

The arrangement is so made that the material necessary for the construction is substantially a minimum. The pipes 22 and 23 and the brick walls surrounding them being supported from above by a special frame work, the arch 12 may be constructed with a view of merely supporting itself and safely resisting the disintegrating forces due to expansion and contraction. The cast iron bull rings 24 and 25 even may be omitted.

The bottom of the reaction chamber is uniformly supported by a plurality of walls i. e. the walls 13. It may therefore be constructed with regard principally to an economical utilization of the heat of combustion. In fact both the arch 12 and the bottom 10 are so constructed as to promote a high and substantially uniform heat transmission to the interior of the reaction chamber.

The heat distribution is facilitated by the staggered relation of the openings 14 in the walls 13.

We are familiar with the constructions of the prior art and are fully aware that our invention is of relatively narrow scope. To the extent, however, that our arrangement differs from the prior art, it marks an important improvement in regard to both the construction and operation.

We claim:—

1. In a furnace of the type for carrying out chemical processes involving the interaction of corrosive materials at high temperatures, the combination of a reaction chamber having a bottom, side walls and a roof of ceramic material, a combustion chamber including as its bottom the roof of the reaction chamber, a gas pipe and a feed pipe extending centrally up from the reaction chamber through the combustion chamber, and means situated above the combustion chamber for supporting the said pipes.

2. In a furnace of the type for carrying out chemical processes involving the interaction of corrosive materials at high temperatures, the combination of a reaction chamber having a bottom, side walls and a roof of ceramic material, a combustion chamber including as its bottom the roof of the reaction chamber, a gas pipe and a feed pipe extending centrally up from the reaction chamber through the combustion chamber, means for supporting the said pipes at their upper ends, a secondary combustion chamber including a plurality of parallel walls supporting the reaction chamber and defining gas passages, said walls having openings disposed in staggered relation, and flue connections for interconnecting the said combustion chambers.

3. In a furnace of the type for carrying out chemical processes involving the interaction of corrosive materials at high temperatures, the combination of a reaction chamber having a bottom, side walls and a roof of ceramic material, a combustion chamber including as its bottom the roof of the reaction chamber, a gas pipe and a feed pipe extending centrally up from the reaction chamber through the combustion chamber, and bull rings set into the roof of the reaction chamber and surrounding the lower end of the pipes, the pipes being connected to the respective bull rings by rust joints, and means for supporting the pipes at their upper ends.

4. In a furnace of the type for carrying out chemical processes involving the interaction of corrosive materials at high temperatures, the combination of a reaction chamber having a bottom, side walls and a roof of ceramic material, a combustion chamber including as its bottom the roof of the reaction chamber, a gas pipe and a feed pipe extending centrally up from the reaction chamber through the combustion chamber, a flange on each pipe immediately above the roof of the reaction chamber, a ceramic lining surrounding each pipe and supported upon the respective flanges, and means for supporting the pipes at their upper ends.

5. In a furnace of the type for carrying out chemical processes involving the interaction of corrosive materials at high temperatures, the combination of a reaction chamber having a bottom, side walls and a roof of ceramic material, a combustion chamber including as its bottom the roof of the reaction chamber, a gas pipe and a feed pipe extending centrally up from the reaction chamber through the combustion chamber, bull rings set into the roof of the reaction chamber and surrounding the lower ends of the pipes, the pipes being connected to the respective bull rings by rust joints, a flange on each pipe immediately above the roof of the reaction chamber, a ceramic lining surrounding each pipe and supported upon the respective flanges, and means for supporting the pipes at their upper ends.

6. An all ceramic furnace, comprising a reaction chamber, a primary combustion chamber including as its bottom the roof of the reaction chamber, a secondary combustion chamber below the reaction chamber, flue connections for interconnecting the combustion chambers, the combustion chambers being constructed and arranged to afford a substantially uniform heat distribution over the roof and below the bottom of the reaction chamber, a gas pipe and a feed pipe extending from the reaction chamber through the combustion chamber and means for supporting the pipes at their upper ends.

In testimony whereof, we affix our signatures.

OSBORNE BEZANSON.
MYLES S. MAXIM.